(12) United States Patent
Fick et al.

(10) Patent No.: US 7,575,377 B2
(45) Date of Patent: Aug. 18, 2009

(54) COMBINED RADIAL AND AXIAL BEARING

(75) Inventors: Matthias Fick, Schnaittach (DE); Norbert Radinger, Nuremberg (DE)

(73) Assignee: Ina-Schaeffler KG, Herzogenaurach (DE)

( * ) Notice: Subject to any disclaimer, the term of this patent is extended or adjusted under 35 U.S.C. 154(b) by 728 days.

(21) Appl. No.: 10/548,610

(22) PCT Filed: Feb. 20, 2004

(86) PCT No.: PCT/EP2004/001652
§ 371 (c)(1), (2), (4) Date: Oct. 14, 2005

(87) PCT Pub. No.: WO2004/079212
PCT Pub. Date: Sep. 16, 2004

(65) Prior Publication Data
US 2006/0147140 A1  Jul. 6, 2006

(30) Foreign Application Priority Data
Mar. 8, 2003  (DE) .............................. 103 10 224

(51) Int. Cl.
*F16C 19/54* (2006.01)
(52) U.S. Cl. .................................... 384/455
(58) Field of Classification Search ......... 384/452–455, 384/619, 620, 622, 903; 403/109.3, 109.8, 403/329, 397; 411/530
See application file for complete search history.

(56) References Cited

U.S. PATENT DOCUMENTS

| | | | | |
|---|---|---|---|---|
| 3,930,692 | A | * | 1/1976 | Condon et al. ............. 384/455 |
| 4,168,869 | A | * | 9/1979 | Stephan ..................... 384/455 |
| 5,158,375 | A | * | 10/1992 | Uchida et al. .............. 384/455 |

FOREIGN PATENT DOCUMENTS

| | | |
|---|---|---|
| DE | 14 25 083 | 3/1969 |
| DE | 1425083 | 3/1969 |
| DE | 70 35 695 | 9/1970 |
| DE | 71 29 249 | 7/1971 |
| DE | 20 25 239 | 12/1971 |
| DE | 26 00 955 | 7/1976 |
| DE | 76 23 390 | 7/1976 |
| DE | 43 03 855 C 1 | 6/1994 |
| DE | 694 15 469 | 12/1998 |

* cited by examiner

*Primary Examiner*—Thomas R Hannon
*Assistant Examiner*—Phillip Johnson
(74) *Attorney, Agent, or Firm*—Charles A. Muserliar

(57) ABSTRACT

A combined radial and axial bearing is defined by the fact that the bearing ring (1) of the radial bearing is held at an axial end by a mounting bore in the runner plate (2) of the axial bearing, and the positively locking engagement is brought about by means of a ring (3) which is arranged between the bearing ring (1) and runner plate and is configured in such a way that the bearing ring (1) and runner plates (2) are prevented from rotating with respect to one another in the circumferential direction but limited axial displacement is possible.

5 Claims, 4 Drawing Sheets

COMBINED RADIAL AND AXIAL BEARING

This application is a 371 of PCT/EP2004/001652 filed Feb. 20, 2004.

FIELD OF APPLICATION OF THE INVENTION

The invention relates to a combined radial and axial bearing, composed of a series of axially positioned needles or rollers for taking up a radial load and a series of radially positioned needles or rollers for taking up an axial load, in which case a bearing ring of the radial bearing and a runner plate of the axial bearing are connected in a positively locking fashion to form one physical unit.

BACKGROUND OF THE INVENTION

A bearing arrangement which is formed according to such a generic type is already known from German laid-open patent application DE-A 26 00 955. In FIG. 4 of this prior publication, a needle sleeve which acts as a radial bearing and whose radially inwardly extending rim which is arranged on the left side is continued by an axially extending part is shown. Projections which are uniformly spaced apart from one another in the circumferential direction and which point radially outwards at an oblique angle project from said axially extending part. These projections in turn engage in cutouts which are associated with the runner plate of the axial bearing. In this way, a radial and axial bearing unit which is held together by positively locking engagement is formed.

Such combined roller bearings are often used in converters of motor vehicle transmissions, with the bearing ring of the radial bearing being pressed into a housing, that is to say being stationary. In this context, the shaft lifts off in the axial direction in certain operating states. At the start of the process in which the shaft is refitted onto the axial bearing ring, the latter is made to rotate and in doing so attempts to entrain the axial runner plate, which is, however, connected to the bearing ring of the radial bearing in a positively locking fashion.

One disadvantage of the radial and axial bearing of the generic type which is described above is that the selected positively locking engagement does not satisfy all requirements. There is the risk of such a positively locking connection being overtightened under large loads, i.e. the runner plate of the axial part is rotated and can thus become embedded in the housing. It is to be considered a further disadvantage that such a combined radial and axial bearing arrangement cannot be displaced in the axial direction, that is to say cannot compensate any axial fluctuations in tolerance. Furthermore, it is disadvantageous that such a connection between radial and axial parts takes up a large installation space.

A further way of connecting radial and axial parts of a combined bearing is described in German utility patent application GM 76 23 390. According to said application, an axial bearing plate and a needle sleeve are held one against the other by bonding. It is self evident in this case that the cohesion of the bearing arrangement is at best provided up to its installation.

SUMMARY OF THE INVENTION

The invention is therefore based on the object of avoiding the described disadvantages and of developing an improved, positively locking connection between the radial and axial parts of a combined bearing.

According to the invention, this object is achieved according to the defining part of claim 1 in conjunction with its preamble in that the bearing ring of the radial bearing is held at an axial end by a mounting bore in the runner plate of the axial bearing, and the positively locking engagement is brought about by means of a ring which is arranged between the bearing ring and runner plate and is configured in such a way that the bearing ring and runner plate are prevented from rotating with respect to one another in the circumferential direction but limited axial displacement is possible.

The configuration according to the invention provides a combined radial and axial bearing which must contain no complicatedly shaped bearing ring of the radial bearing and no complicatedly shaped runner plate of the axial bearing in order to ensure the positively locking engagement between the involved partners. A further advantage is that the combined bearing unit is short in the axial direction since the ring which produces the positively locking engagement is arranged within the bearing. Furthermore, the simple mounting of the combined bearing unit is advantageous since the individual bearing components ultimately only have to be pushed one inside the other. A further significant advantage is that in addition to the absolute protection against rotation provided for the bearing ring and runner plate in the circumferential direction the bearing unit cannot be damaged during installation since axial compensation of lengths between the axial and radial parts is possible. In this way, tolerances which are present between the housing and the part which is to be mounted can also be compensated in an elegant way.

Thus, as claimed in claim 2, there is provision that the ring has projections which project in the axial direction at a plurality of circumferential points which are uniformly spaced apart from one another. Although this ring has to be additionally fabricated compared to the prior art, this is not actually significant since its advantages outweigh the additional manufacturing costs in all cases.

Thus as claimed in claim 3 there is the provision that the ring has, viewed in cross section, a round or polygonal shape. Manufacture can be carried out as claimed in claim 4 in such a way that the ring is bent from a wire whose two ends are welded together. Finally, according to claim 5 said ring is to be fabricated from a soft steel because it should be capable of being caulked within the bearing arrangement according to the invention.

Finally, the precise position of the ring within the combined radial and axial bearing is described. According to this there is provision for the bearing ring to be provided with a radially directed rim and for the runner plate to be provided with an axially directed rim, in which case the axially directed rim of the runner plate is continued by a radially directed rim and both radially directed rims have cutouts which are uniformly spaced apart from one another in the circumferential direction and by which the ring is held by means of its projections.

The invention will be explained in more detail using the following exemplary embodiment.

DETAILED DESCRIPTION OF THE DRAWINGS

Figure 1:
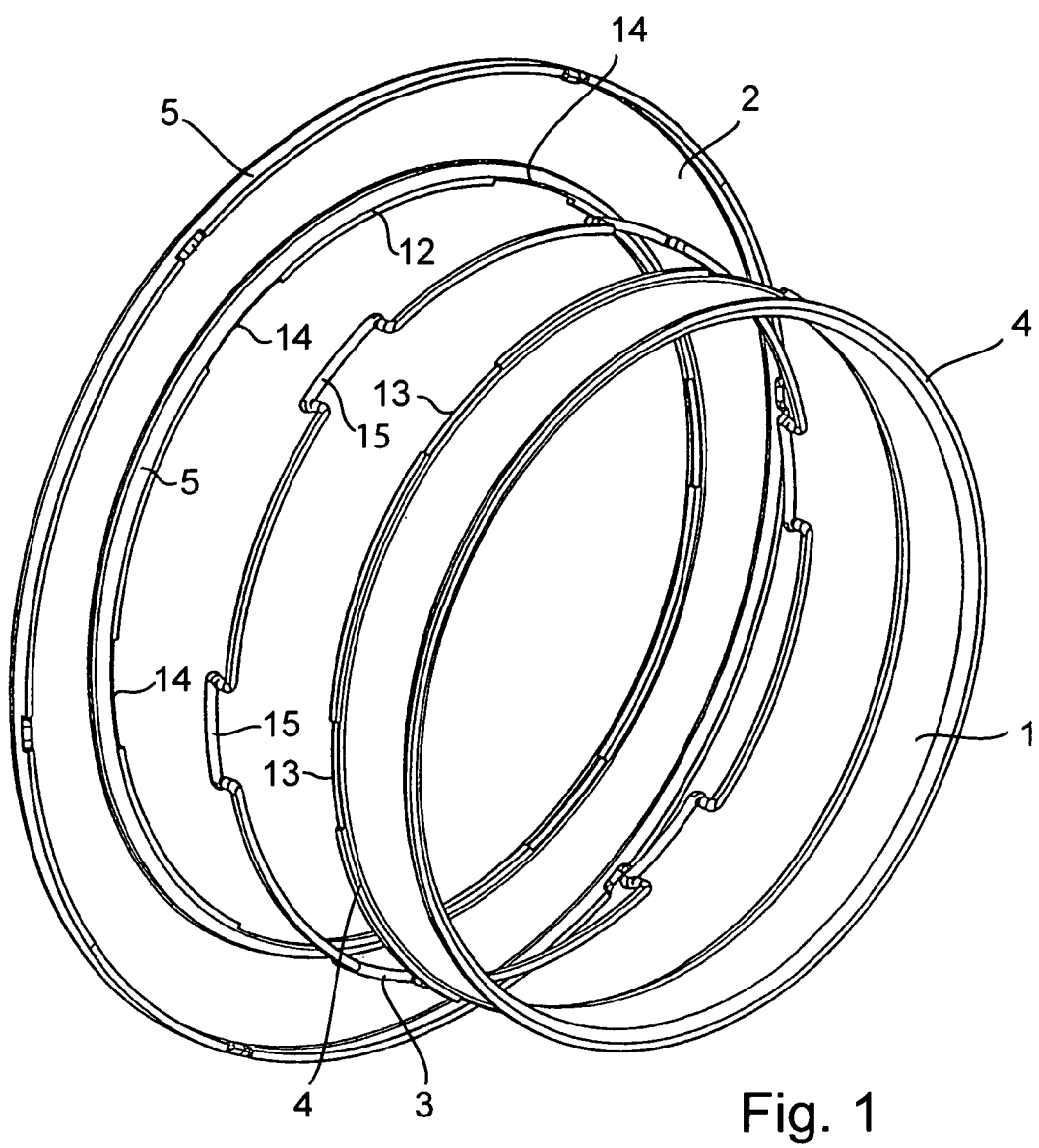
FIG. 1 is a perspective illustration of a bearing ring, runner plate and ring which forms a positively locking engagement.
Figure 2:
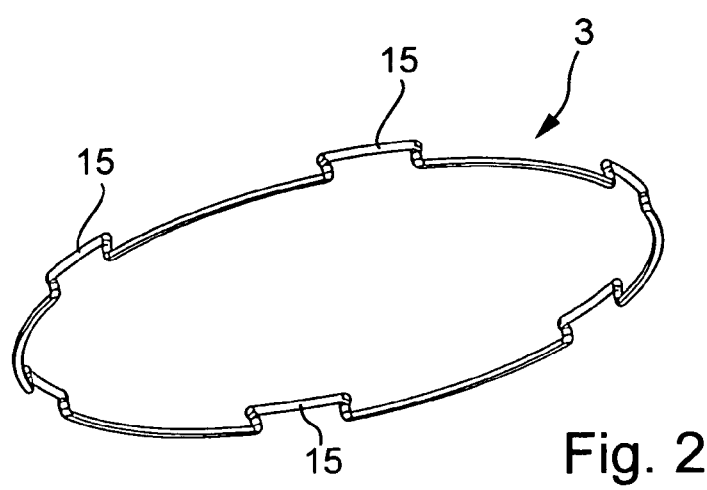
FIG. 2 is a perspective illustration of the ring.
Figure 3:
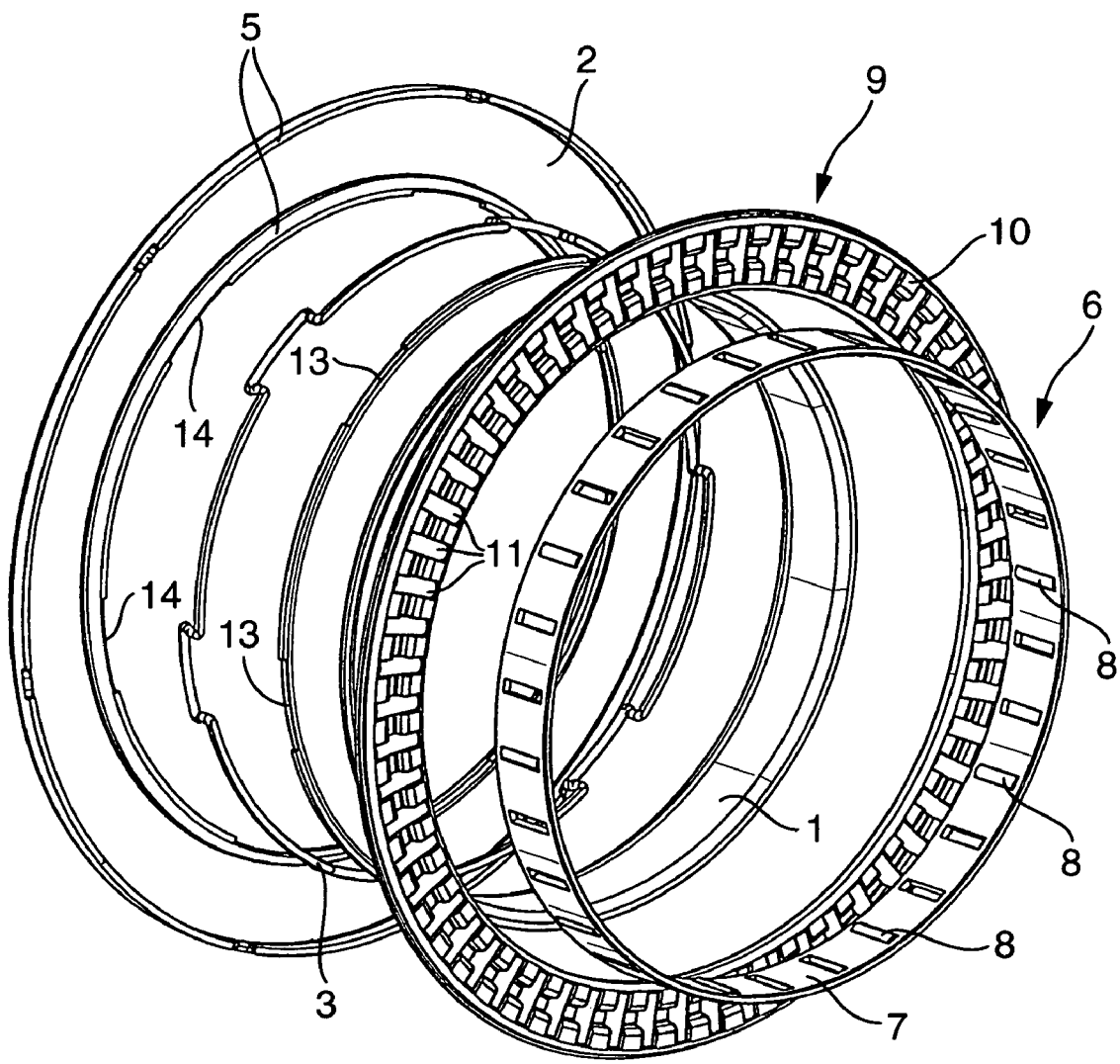
FIG. 3 is a perspective illustration of the bearing ring, runner plate and ring with associated needle rings.

As is apparent from FIGS. 1 to 6, the combined radial and axial bearing according to the invention is composed of the bearing ring 1 of the radial bearing, the runner plate 2 of the axial bearing and the ring 3 which forms the positively locking engagement between the two parts 1, 2. The bearing ring 1 is provided on each side with radially outwardly directed rims 4, while the runner plate 2 is equipped on each side with the axially directed rims 5. Both rims 4, 5 bound, between them, the raceways for the radial ring 6 which is shown in FIG. 3, and for the axial ring 9, which radial and axial rings 6, 9 are composed of needles 8 which are guided in the cage 7, and of needles 11 which are guided in the cage 10, respectively. The axially directed internal rim 5 of the runner plate 2 merges with the radially inwardly directed rim 12. Both the radially outwardly directed rim 4, arranged on the left, of the bearing ring 1 and the radially inwardly directed rim 12 of the runner plate 2 are provided with cutouts 13, 14 which are uniformly spaced apart from one another in the circumferential direction. As is shown further by the aforesaid figures, the ring 3 is provided at a plurality of circumferential points which are uniformly spaced apart from one another, with projections 15 which, as will be seen later, correlate with the cutouts 13, 14.

Figure 4:
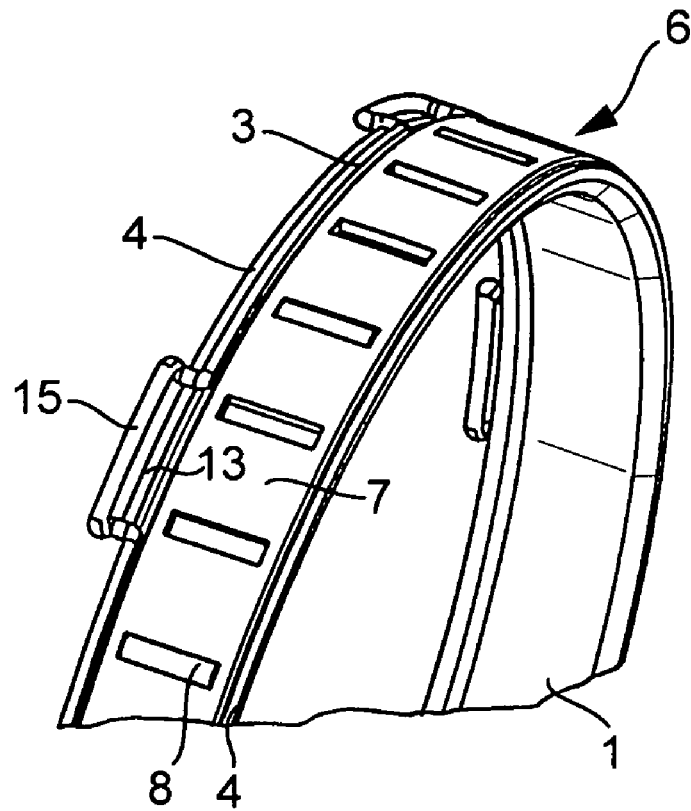
FIG. 4 is a partially perspective illustration of the bearing ring with ring fitted on, FIG. 5 is a partially perspective illustration of a completely combined radial and axial bearing.

As is shown by the enlarged illustration of the radial part in FIG. 4, the bearing ring 1 has a raceway which is bounded by two rims 4 and on which the needles 8 which are guided in the cage 7 roll. When the radial component is mounted, the ring 3 is firstly fitted onto the bearing ring 1 so that its projections 15 are pushed into the cutouts 13 on the left-hand rim 4. Afterwards, the radial ring 6 is fitted onto the bearing ring 1 before the rim 4 which is arranged on the right-hand side is chamfered.

Figure 5:
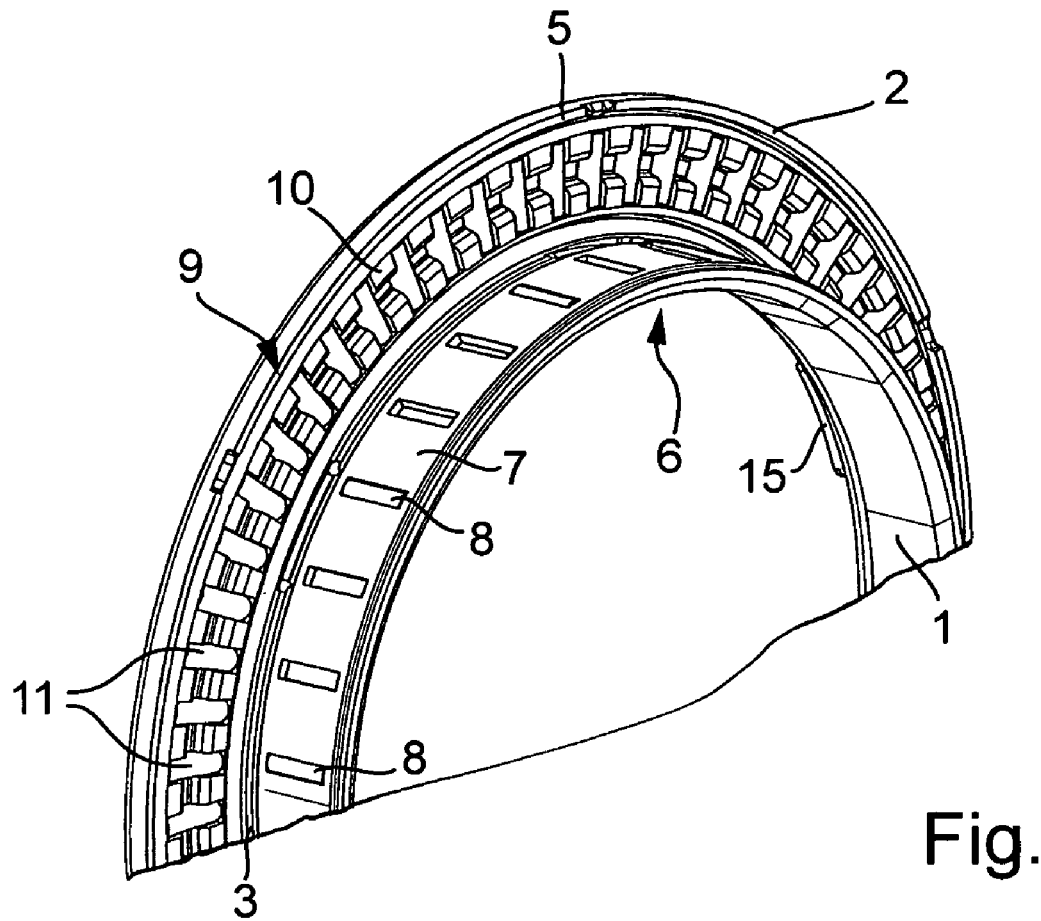
Figure 6:
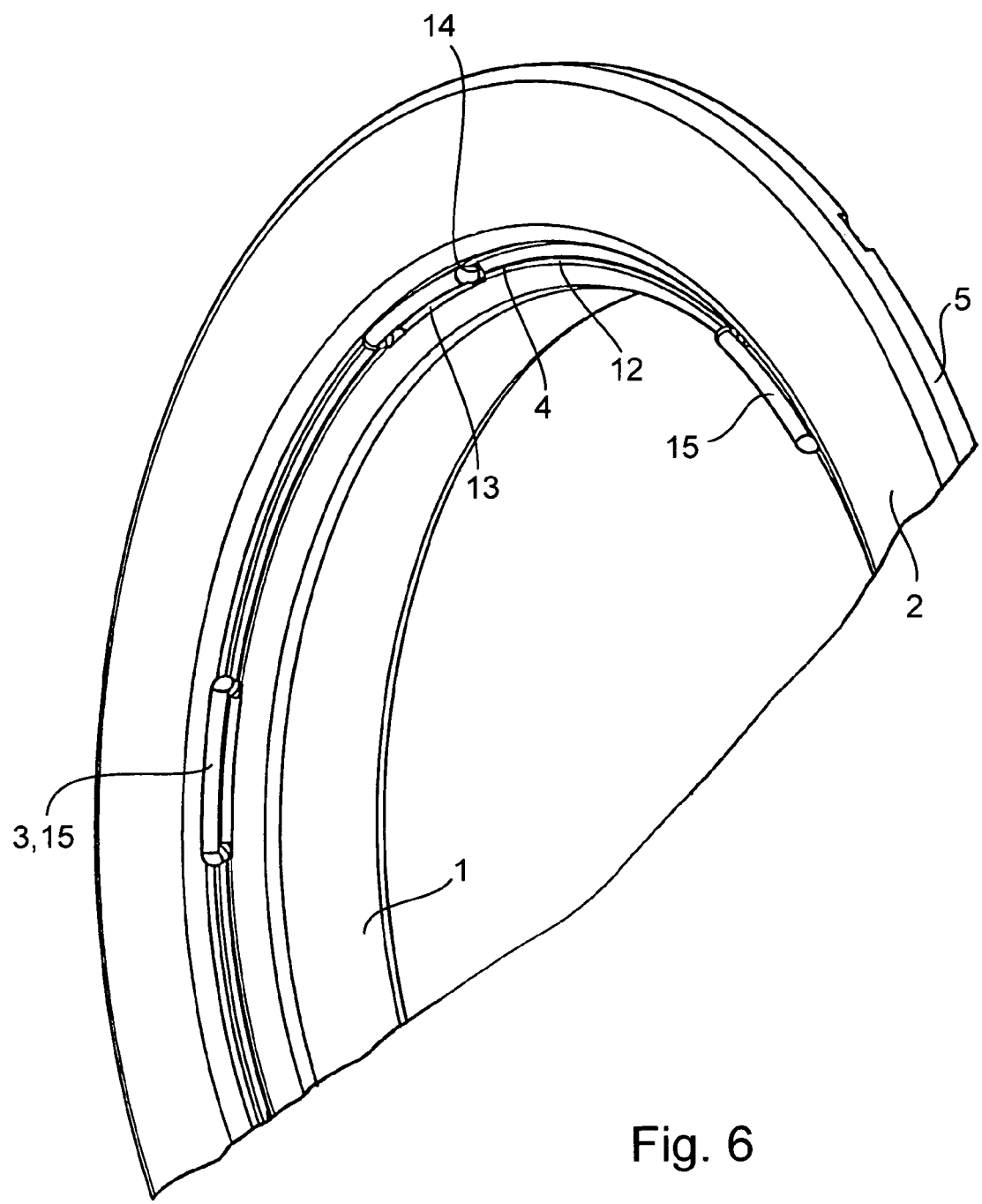
FIG. 6 is a partially perspective illustration of the rear of a combined radial and axial bearing.

As is apparent from FIGS. 5 and 6, the runner plate 2 has an axially directed rim 5 on both the inside and outside, said rims 5 bounding a raceway for the needles 11 which are guided in the cage 10. As is further apparent, the axially directed rim 5 which is arranged on the inside merges with the radially inwardly directed rim 12 which is provided with cutouts 14 which are uniformly spaced apart from one another in the circumferential direction. When the cutouts 13, 14 correspond in the circumferential direction with the radial part and axial part of the combined bearing arrangement, a free space is bounded, in which space the ring 3 is held by its projections 15.

As is apparent from the illustration of the rear of the bearing arrangement according to the invention in FIG. 6, in each case approximately half of the free space for holding the projections 15 of the ring 3 is formed by the cutouts 13 and 14. In order to prevent the projections 15 from flipping out of the free space, they are slightly caulked in the circumferential direction. This must be done in such a way that the axial mobility of the bearing ring 1 and runner plate 2 is not impeded in the process. FIG. 6 shows further that the mounting bore in the runner plate 2 for holding the bearing ring 1 is formed by its radially inwardly directed rim 12.

List of Reference Numerals

1 Bearing ring
2 Runner plate
3 Ring
4 Rim
5 Rim
6 Radial ring
7 Cage
8 Needles
9 Axial ring
10 Cage
11 Needles
12 Rim
13 Cutout
14 Cutout
15 Projection

The invention claimed is:

1. A combined radial and axial bearing, composed of a series of axially positioned needles or rollers for taking up a radial load and a series of radially positioned needles or rollers for taking up an axial load, in which case a bearing ring of the radial bearing and a runner plate of the axial bearing are connected in a positively locking fashion to form one physical unit, characterized in that the bearing ring of the radial bearing is held at an axial end by a mounting bore in the runner plate of the axial bearing, and the positively locking engagement is brought about by means of a ring which is arranged between the bearing ring and runner plate and is configured in such a way that the bearing ring and runner plate are prevented from rotating with respect to one another in the circumferential direction but limited axial displacement is possible wherein the ring has projections which project in the axial direction at a plurality of circumferential points which are uniformly spaced apart from one another.

2. The radial and axial bearing as claimed in claim 1, wherein the ring has, viewed in cross section, a round or cornered shape.

3. The radial and axial bearing as claimed in claim 1, wherein the ring is bent from a wire and its two ends are welded together.

4. The radial and axial bearing as claimed in claim 1, wherein the ring is fabricated from a steel.

5. The radial and axial bearing as claimed in claim 1, wherein the bearing ring is provided with a radially directed rim and the runner plate is provided with an axially directed rim of the runner plate is continued by a radially directed rim and both radially directed rims have cutouts which are uniformly spaced apart from one another in the circumferential direction and by which the ring is held by means of its projections.

* * * * *